United States Patent
Son et al.

(10) Patent No.: US 9,905,816 B2
(45) Date of Patent: Feb. 27, 2018

(54) RECHARGEABLE BATTERY AND MANUFACTURING METHOD OF THE SAME

(71) Applicant: SAMSUNG SDI CO., LTD., Yongin-si, Gyeonggi-do (KR)

(72) Inventors: Dong-Ho Son, Yongin-si (KR); Ki-Jun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 466 days.

(21) Appl. No.: 14/537,797

(22) Filed: Nov. 10, 2014

(65) Prior Publication Data
US 2015/0162575 A1    Jun. 11, 2015

(30) Foreign Application Priority Data
Dec. 10, 2013 (KR) .......... 10-2013-0153222

(51) Int. Cl.
H01M 2/02 (2006.01)
H01M 2/16 (2006.01)
(Continued)

(52) U.S. Cl.
CPC ....... *H01M 2/0275* (2013.01); *H01M 2/0212* (2013.01); *H01M 2/1673* (2013.01);
(Continued)

(58) Field of Classification Search
CPC ............. H01M 2/0275; H01M 2/0212; H01M 4/0433; H01M 4/806; H01M 4/78;
(Continued)

(56) References Cited

U.S. PATENT DOCUMENTS

2003/0193317 A1* 10/2003 Shimamura ......... H01M 2/0212
                                                                    320/116
2007/0226990 A1    10/2007 Morimoto
(Continued)

FOREIGN PATENT DOCUMENTS

EP    0 991 132 A2    4/2000
EP    1 104 941 A1    6/2001
(Continued)

OTHER PUBLICATIONS http://journals.sagepub.com/doi/abs/10.1177/0892705704045187, accessed Jan. 22, 2017.*
(Continued)

*Primary Examiner* — Lisa S Park
(74) *Attorney, Agent, or Firm* — Lewis Roca Rothgerber Christie LLP

(57) ABSTRACT

A rechargeable battery that may be manufactured and used in various shapes is disclosed. An embodiment of the rechargeable battery includes: an electrode assembly including a pair of electrodes on respective surfaces of a separator and a pair of lead tabs extending from the pair of electrodes; and a pouch receiving the electrode assembly and having the lead tabs protruding out to one side, each of the electrodes including a first bending part including a molded plate including active material particles and a metal fiber yarn of a current collector, and the pouch including a second bending part superimposed on the electrodes in parallel and including a molded sheet having a shape corresponding to that of the first bending part.

11 Claims, 8 Drawing Sheets

(51) Int. Cl.
*H01M 4/04* (2006.01)
*H01M 4/78* (2006.01)
*H01M 10/04* (2006.01)
*H01M 4/80* (2006.01)
*H01M 4/66* (2006.01)
*H01M 4/02* (2006.01)

(52) U.S. Cl.
CPC .......... *H01M 4/0433* (2013.01); *H01M 4/78* (2013.01); *H01M 4/806* (2013.01); *H01M 10/0436* (2013.01); *H01M 4/661* (2013.01); *H01M 2004/025* (2013.01); *Y10T 29/49108* (2015.01); *Y10T 29/49114* (2015.01)

(58) Field of Classification Search
CPC .......... H01M 2/1673; H01M 10/0436; H01M 4/661; H01M 2004/025; Y10T 29/49108; Y10T 29/49114
See application file for complete search history.

(56) References Cited

U.S. PATENT DOCUMENTS

| | | | |
|---|---|---|---|
| 2008/0286635 A1* | 11/2008 | Seino | B32B 7/12 |
| | | | 429/94 |
| 2009/0311587 A1* | 12/2009 | Best | H01M 4/74 |
| | | | 429/127 |
| 2012/0015236 A1 | 1/2012 | Spare | |
| 2012/0058387 A1* | 3/2012 | Ahn | H01M 2/0275 |
| | | | 429/163 |
| 2013/0202960 A1* | 8/2013 | Kim | H01M 4/02 |
| | | | 429/209 |
| 2013/0280580 A1 | 10/2013 | Gaikwad et al. | |
| 2014/0090236 A1 | 4/2014 | Goh et al. | |

FOREIGN PATENT DOCUMENTS

| | | |
|---|---|---|
| EP | 2 251 921 A2 | 11/2010 |
| EP | 2 696 399 A2 | 2/2014 |
| JP | 2007-273249 | 10/2007 |
| KR | 10-2011-0073405 | 6/2011 |
| KR | 10-2012-0114117 | 10/2012 |
| WO | WO 2007/118281 A1 | 10/2007 |
| WO | WO 2012/138115 A2 | 10/2012 |

OTHER PUBLICATIONS

EPO Search Report dated Apr. 8, 2015, for corresponding European Patent application 14197013.7, (10 pages).
Xue, Nansi et al, *Optimization of a Single Lithium-Ion Battery Cell with a Gradient-Based Algorithm*, Journal of The Electrochemical Society, May 7, 2013, pp. 1071-1078, XP055179817.
Anonymous: "Pouch Cell Case/Cup Forming Machine for Aluminum-Laminated Films—MSK-120," Aug. 20, 2013, XP055345415, Retrieved from the Internet: URL:http://web.archive.org/web/20130820092458/http://www.mtixil.com/PouchCellCase/CupFormingMachine-MSK-120.aspx [retrieved on Feb. 14, 2017].
KIPO Office Action dated Dec. 19, 2016, for corresponding Korean Patent Application No. 10-2013-0153222 (7 pages).
EPO Office Action dated Feb. 23, 2017, for corresponding European Patent Application No. 14197013.7 (6 pages).
EPO Office Action dated Oct. 12, 2017, for corresponding European Patent Application No. 14197013.7 (8 pages).

\* cited by examiner

RECHARGEABLE BATTERY AND MANUFACTURING METHOD OF THE SAME

CROSS-REFERENCE TO RELATED APPLICATION

This application claims priority to and the benefit of Korean Patent Application No. 10-2013-0153222 filed in the Korean Intellectual Property Office on Dec. 10, 2013, the entire content of which is incorporated herein by reference.

BACKGROUND

1. Field

Aspects of embodiments according to the present disclosure relate generally to a rechargeable battery that may be manufactured and used in various three-dimensional shapes, and a manufacturing method of the same.

2. Description of the Related Art

A rechargeable battery is a battery that is configured to repeatedly perform charging and discharging, unlike a primary battery, which is not designed to be repeatedly charged and discharged. A small-capacity rechargeable battery is used in small portable electronic devices, such as a mobile phone, a tablet computer, a laptop computer, and a camcorder. A large-capacity rechargeable battery is used as a power supply for driving a motor, for an electric bicycle, a scooter, an electric vehicle, a fork lift, and the like.

The above information disclosed in this Background section is only for enhancing the understanding of the background of the described technology and therefore it may contain information that does not form the prior art that is already known in this country to a person of ordinary skill in the art.

SUMMARY

Aspects of embodiments of the described technology are directed toward a rechargeable battery that may be manufactured and used in various three-dimensional shapes. Further, aspects of embodiments of the present invention are directed toward a method for manufacturing the rechargeable battery.

An embodiment of a rechargeable battery includes: an electrode assembly including a pair of electrodes on respective surfaces of a separator, and a pair of lead tabs extending from the pair of electrodes; and a pouch receiving the electrode assembly and having the lead tabs protruding out to one side. Each of the electrodes includes a first bending part including a molded plate including a mixture of active material particles and a metal fiber yarn of a current collector. The pouch includes a second bending part superimposed on the electrode in parallel and includes a molded sheet having a shape corresponding to that of the first bending part.

The separator may be adhesive. The pair of electrodes and the separator may be stacked together. A thickness of each of the pair of electrodes may be the same.

The pouch may include: a concave member having a concave part receiving the electrode assembly to at least partially surround an outside of the electrode assembly; and a plane member at least partially covering the electrode assembly and heat-fused to an edge of the concave member.

The first bending part may include: a first bend at a right angle at each of two sides of respective first plane parts of the pair of electrodes; and a second bend at a right angle at a side part connected to the first bend, the second bend being connected to second plane parts parallel to respective extending directions of the first plane parts.

The second bending part may include: a third bend at the concave member and the plane member and having a shape corresponding to that of the first bend of the first bending part; and a fourth bend at the concave member and the plane member and having a shape corresponding to that of the second bend of the first bending part.

The pair of electrodes may include a positive electrode and a negative electrode, the positive electrode may include one sheet, and the negative electrode may include two sheets, each of the sheets of the negative electrode being on a respective surface of the sheet of the positive electrode and having the separator therebetween.

A thickness of each sheet of the negative electrode may be equal to ½ of a thickness of the sheet of the positive electrode.

The electrode assembly may include alternately stacked n positive electrodes and n+1 negative electrodes, n being an integer.

The negative electrode may include: an outer negative electrode at an outermost side of the electrode assembly and having a thickness equal to ½ of a thickness of one of the n positive electrodes; and an inner negative electrode in the electrode assembly and having a thickness that is the same thickness as that of one of the n positive electrodes.

Another embodiment provides a method for manufacturing a rechargeable battery including: manufacturing a plate by mixing active material particles and a metal fiber yarn of a current collector and compressing the resultant mixed product; molding an electrode having a set shape by pressing the plate utilizing an electrode mold; molding a pouch utilizing a pouch mold having a shape corresponding to the set shape of the electrode; and assembling an electrode with the pouch by locating the electrode on two surfaces of a separator and extending a lead tab from the electrode.

The surfaces of the separator may be adhesive and the electrode may be stacked and attached on the surfaces of the separator.

The electrode may include two or more electrodes, thicknesses of the electrodes may be the same and stacked and attached on the surfaces of the separator.

The electrode may include a positive electrode including one sheet and a negative electrode including two sheets, the separator includes two separators, and in the assembling of the electrode assembly, the sheets of the negative electrode may be respectively attached to the separators by stacking the separators on respective surfaces of the positive electrode.

The sheets of the negative electrode may each have a thickness that is ½ of a thickness of the sheet of the positive electrode.

As set forth above, according to aspects of embodiments of the disclosure, it is possible to manufacture the rechargeable battery in various three-dimensional shapes by forming the plate with the resultant mixed product of the active material particles and the metal fiber yarn of the current collector, forming the electrode by molding the plate, forming the pouch to have a shape corresponding to that of the electrode to assemble the electrode assembly and the pouch.

For example, according to embodiments of the disclosure, it is possible to more efficiently use a rechargeable battery (e.g., more efficiently than a rechargeable battery having a shape according to the related art) by manufacturing the rechargeable battery in a shape corresponding to a space and shape which may be allowed (or accommodated) in various devices.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
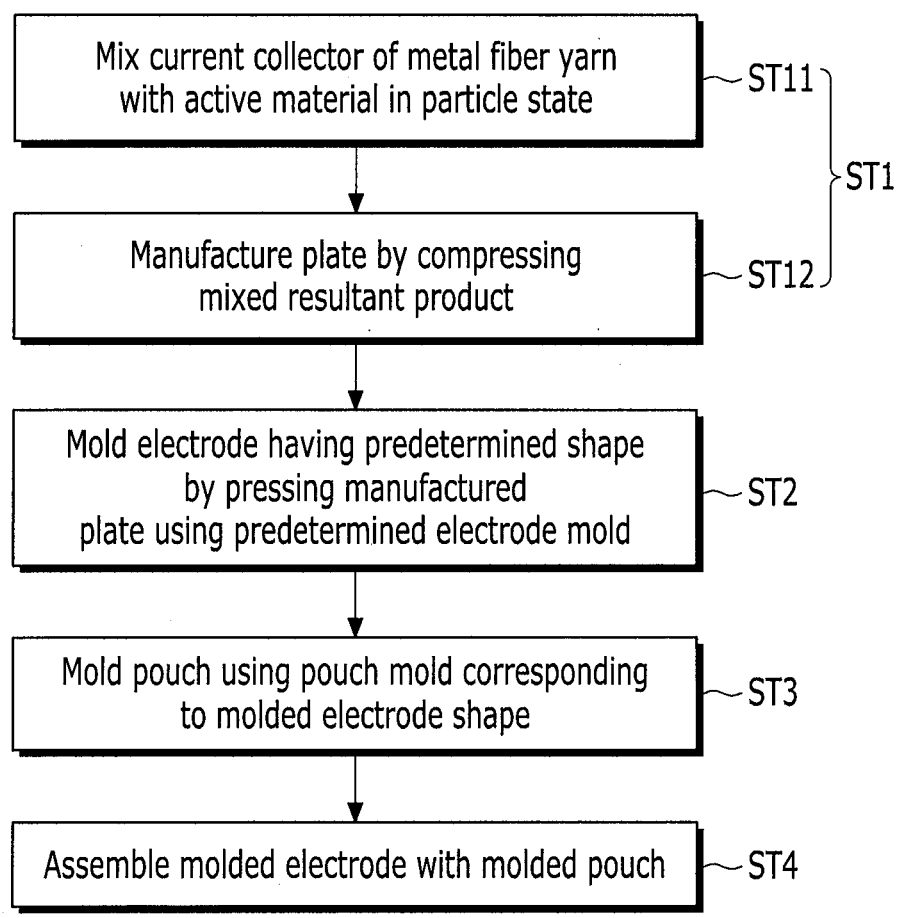
FIG. 1 is a flow chart illustrating a method for manufacturing a rechargeable battery according to an embodiment.

Hereinafter, the present invention will be described more fully with reference to the accompanying drawings, in which certain embodiments of the invention are shown, by way of illustration. As those skilled in the art would realize, the described embodiments may be modified in many different ways, all without departing from the spirit or scope of the present invention. The drawings and description are to be regarded as illustrative in nature and not restrictive. Like reference numerals designate like elements throughout the specification. Also, in the context of the present application, when a first element is referred to as being "on" a second element, it can be directly on the second element or be indirectly on the second element with one or more intervening elements therebetween.

Generally, a rechargeable battery is formed in a circular shape or a quadrangular shape (e.g., a square shape) in which an electrode assembly is received in a metal case, or a pouchshape. Because the rechargeable battery has the circular shape, the quadrangular shape, or the pouch shape, the rechargeable battery is limited in its ability to appropriately correspond to a shape of the device in which the battery is used. Hereinafter, embodiments according to the present disclosure will be described, which relate to a rechargeable battery that may be manufactured in a shape corresponding to a space and shape which may be allowed (or accommodated) in various devices, and a method for manufacturing the same.

Figure 2:
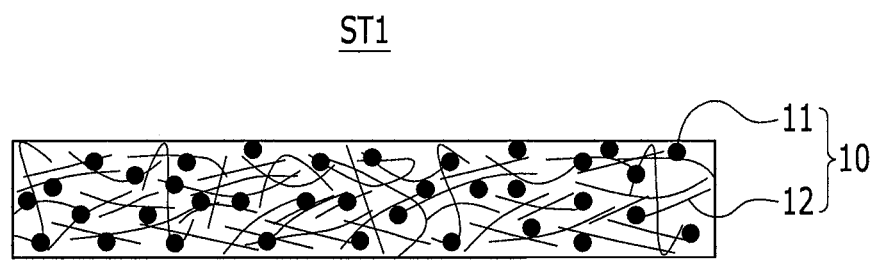
FIG. 2 is a cross-sectional view of an embodiment of a plate for molding including an active material and a current collector.
Figure 3:
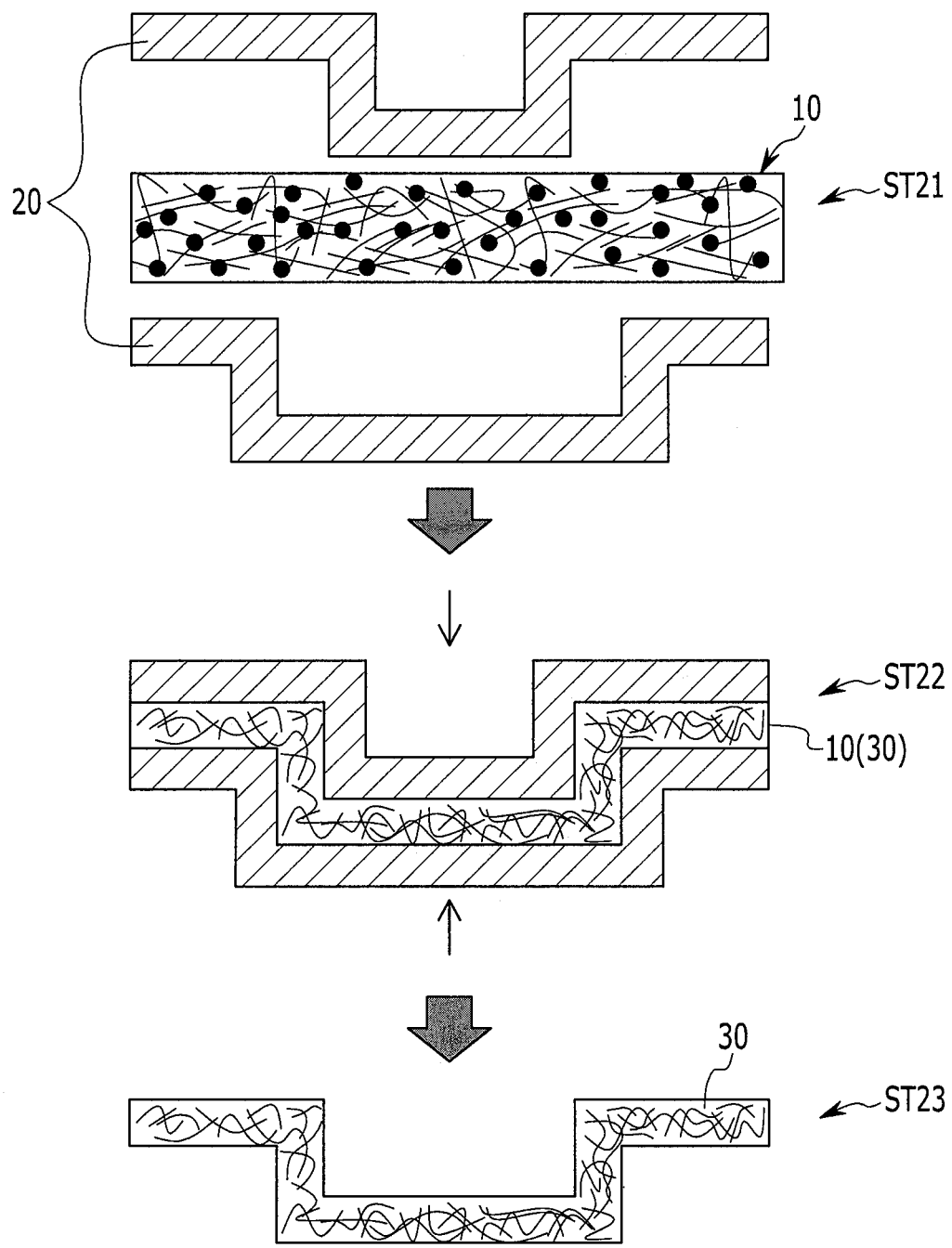
FIG. 3 is a series of cross-sectional views illustrating an embodiment of a process for molding an electrode using an embodiment of the plate.

FIG. 1 is a flow chart of a method for manufacturing a rechargeable battery according to an embodiment of the present invention, FIG. 2 is a cross-sectional view of an embodiment of a plate for molding including an active material and a current collector, and FIG. 3 is a series of cross-sectional views illustrating an embodiment of a process for molding an electrode using an embodiment of the plate.

Referring to FIGS. 1 to 3, a method for manufacturing a rechargeable battery according to an embodiment of the present invention includes manufacturing a plate 10 (ST1), manufacturing an electrode 30 (ST2), molding a pouch (ST3), and assembling an electrode assembly with the pouch (ST4).

In the manufacturing of the plate ST1, the plate 10 is manufactured by mixing an active material 11, the active material including active material particles (e.g., the active material being in a particle state), and a current collector 12 including a metal fiber yarn (ST11). For example, the manufacturing of the plate ST1 can include mixing the active material particles and the metal fiber yarn (e.g., it can include embedding the active material particles in the current collector). Then, the manufacturing of the plate ST1 further includes compressing the resultant mixed product (ST12). In the manufacturing of the plate (ST1), the plate 10 may be manufactured by being compressed and then undergoing a sintering process.

In the plate 10, the active material 11 is bound with a strong fastening force by the current collector 12 (e.g., the active material 11 is supported by or embedded in the current collector 12). The current collector 12 includes (e.g., is formed of) the metal fiber yarn and, thus, the current collector 12 (or the metal fiber yarn) is formed to be longer than a maximum diameter of the active material 11, such that a current smoothly flows between particles of the active material 11. The plate 10 is an intermediate product of an embodiment of the process for manufacturing the electrode 30.

In the manufacturing of the electrode 30 ST2, the plate 10 is between electrode molds 20 having a predetermined (or set) shape (ST21), the plate 10 is pressed (ST22) (e.g., the pressing is performed), and then the pressed plate 10 is drawn out from the electrode molds 20 as the electrode 30 having a shape corresponding to that of the electrode molds 20 (ST23). For example, the electrode 30 has a three-dimensional shape.

For convenience, according to the present embodiment of the present invention, FIG. 3 illustrates the electrode mold 20 having a bent shape, but the electrode mold 20 may have (e.g., be formed in) any suitable shape, such as various three-dimensional shapes having a concave and/or convex structure.

The plate 10 includes (e.g., is formed of) the active material 11 in the particle state and the metal fiber yarn of the current collector 12 and, thus, the plate is molded (or deformed) to have a shape corresponding to the shape of the electrode mold 20, thereby molding the electrode 30. The active material 11 and the current collector 12 flow (e.g., flow together) when the plate 10 is molded (or deformed) into the electrode 30. Nevertheless, because the current collector 12 (or the metal fiber yarn) has a length still longer than the diameter of the active material 11, the molded electrode 30 may keep a conducting structure (e.g., an electrically conductive structure) between the active material particles due to the presence of the current collector 12, and the electrode 30 may have high energy density.

In the molding of the pouch ST3, a pouch 40 is molded using a pouch mold corresponding to the three-dimensional shape of the electrode 30. As in the molding of the electrode 30, in the molding of the pouch ST3, a sheet is between the pouch molds, the sheet is pressed, and then the pressed sheet is drawn out, thereby obtaining the pouch 40 (shown in FIGS. 4-6) having a shape corresponding to that of the pouch mold. For example, the pouch 40 has a three-dimensional shape.

The pouch 40 is configured (or formed) to receive an electrode assembly 50 (shown in FIG. 5) including the electrode 30, along with an electrolytic solution. Further, the pouch mold has a shape corresponding to that of the molded electrode 30 and the electrode mold, and may have any suitable shape, such as various three-dimensional shapes having the concave and/or convex structure.

Figure 5:
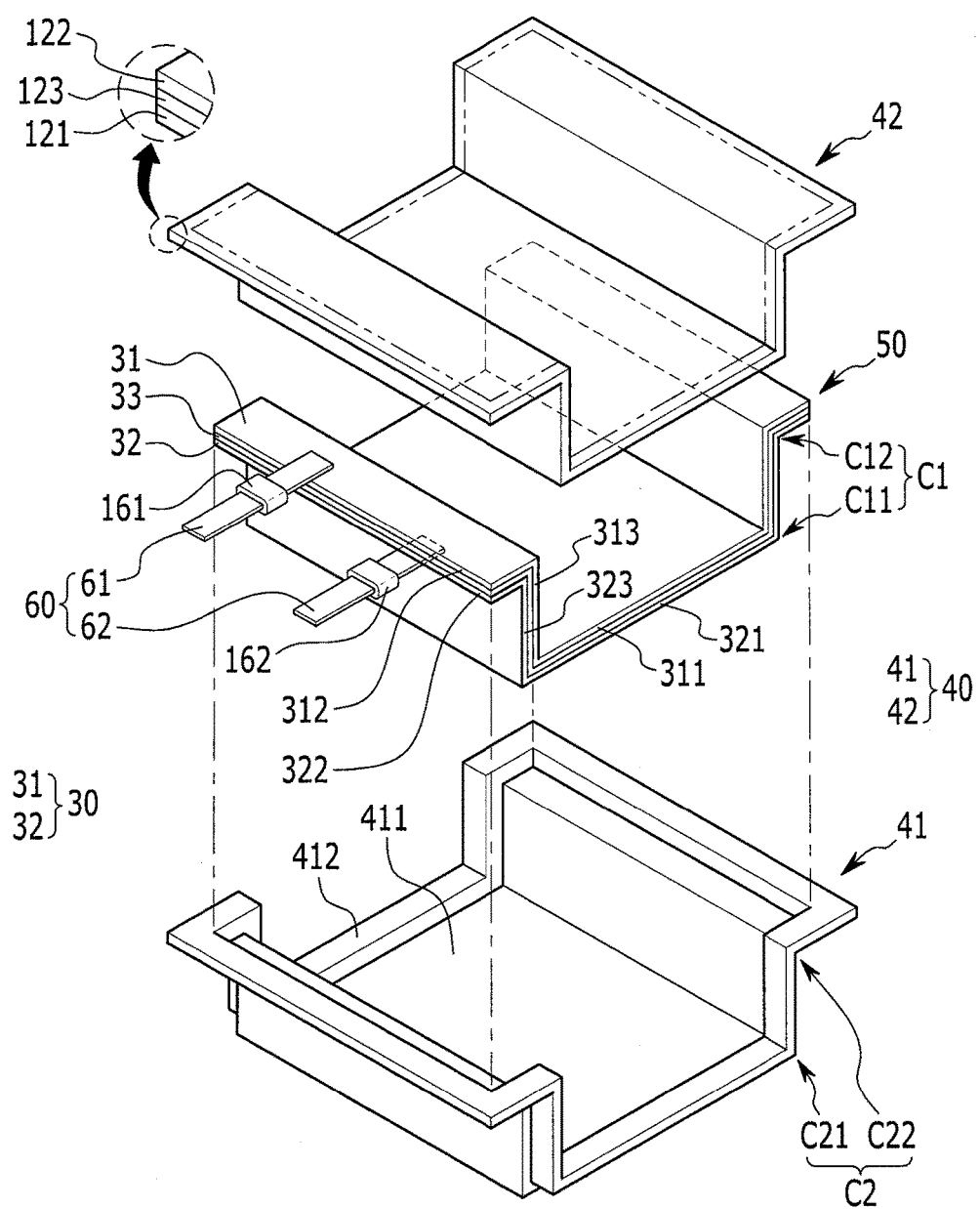
FIG. 5 is an exploded perspective view of the rechargeable battery of FIG. 4.

In the assembling of the electrode assembly ST4, the molded electrodes 30 are located on both surfaces of a separator 33, and the electrode assembly 50, which includes a lead tab 60 extending from the electrode 30, is assembled with the pouch 40 (shown in FIG. 5).

The assembling of the electrode assembly ST4 includes inserting the electrode assembly 50 into the pouch 40, and heat-fusing and sealing an edge of the pouch 40. Further, in the assembling of the electrode assembly ST4, the electrolytic solution may be injected into the pouch 40 prior to sealing the pouch 40 and/or after sealing the pouch 40 by any suitable method generally used in the art.

Hereinafter, a configuration of the electrode 30, the pouch 40, and the electrode assembly 50 will be described in more detail, while describing a configuration of the rechargeable battery 100.

Figure 4:
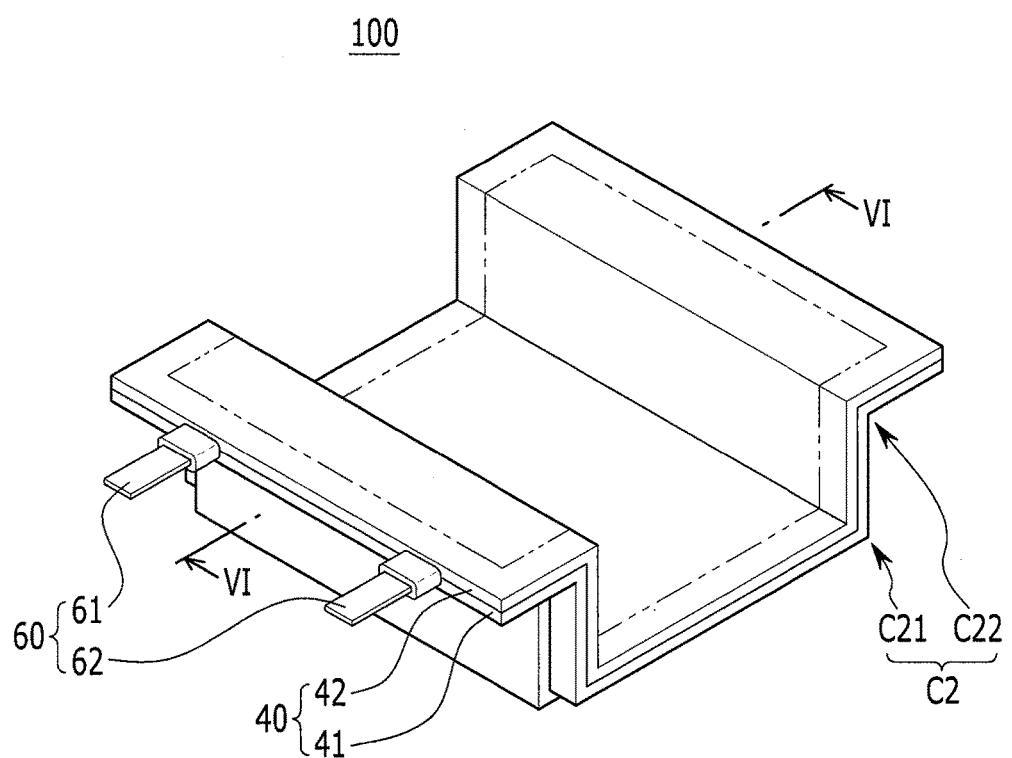
FIG. 4 is a perspective view of a rechargeable battery according to an embodiment.

FIG. 4 is a perspective view of a rechargeable battery according to an embodiment of the present invention and FIG. 5 is an exploded perspective view of the rechargeable battery of FIG. 4. Referring to FIGS. 4 and 5, the rechargeable battery 100 includes the electrode assembly 50 which is capable of charging and discharging, and the pouch 40 for receiving the electrode assembly 50.

The electrode assembly 50 includes a separator 33, a pair of (e.g., two or more) electrodes 30 (for example, a negative electrode 31 and a positive electrode 32) respectively on two (e.g., both) surfaces of the separator 33, and a pair of (e.g., two or more) lead tabs 60 (for example, a negative electrode lead tab 61 and a positive electrode lead tab 62, which extend from the negative electrode 31 and the positive electrode 32, respectively).

For example, the electrode assembly 50 has (e.g., is formed in) a three-dimensional structure corresponding to the shape of the molded electrode 30 (e.g., the negative and positive electrodes 31 and 32) and draws out the negative and positive electrode lead tabs 61 and 62 to one side thereof. The separator 33 may include (e.g., be formed of) a polymer film through which a lithium ion may pass.

The negative and positive electrodes 31 and 32 have a first bending part C1 formed by molding (or deforming) a plate 10, which is formed by mixing the active material 11 in the particle state (e.g., the active material particles) and the metal fiber yarn of the current collector 12 (or by embedding the active material particles in the current collector) and pressing the resultant mixed product. The negative and positive electrode lead tabs 61 and 62 are attached to one side of the negative and positive electrodes 31 and 32 and, thus, are electrically connected to the current collector 12.

As described above, the negative and positive electrodes 31 and 32 are formed of a thicker film than are comparable electrodes formed of an aluminum or copper thin film according to the related art, thereby embodiments of the present disclosure implement the high-capacity and high-efficiency of the rechargeable battery 100.

The first bending part C1 is a part that sets a difference in height between the negative and positive electrodes 31 and 32 based on a plane. As a result of the presence of the first bending part C1, a portion of the negative electrode 31 and/or the positive electrode 32 lies within a plane and an other portion of the negative electrode 31 and/or the positive electrode 32 lies outside of the plane. For example, the first bending part C1 allows the negative and positive electrodes 31 and 32 to have any suitable shape, such as various three-dimensional shapes deviating from a plane state. The first bending part may include a plurality of (e.g., two or more) bends, in which the plurality of bends are connected to each other and, thus, may be formed concavely and/or convexly (e.g., may have a concave and/or convex shape) like a human face shape.

For example, the first bending part C1 of the negative and positive electrodes 31 and 32 includes a first bend C11 and a second bend C12. The first bending part C1 has a first bend C11 at two (e.g., both) sides of the first plane part 311 and 321 of the negative and positive electrodes 31 and 32. The first bend C11 has (e.g., is bent at) an angle (e.g., a right angle) with respect to the first plane parts 311 and 321 of the negative and positive electrodes 31 and 32. The first bending part C1 also has a second bend C12 having (e.g., bent at) an angle (e.g., a right angle) from side portions 313 and 323, which are connected to the first bend C11, to connect second plane parts 312 and 322, which are parallel (e.g., substantially parallel) with an extending direction of the first plane parts 311 and 321, to the side parts 313 and 323.

For example, the negative and positive electrodes 31 and 32 are formed to have the first and second bends C11 and C12, the side portions 313 and 323 at two (e.g., both) sides of the first plane parts 311 and 321, and the second plane parts 312 and 322 connected to the side parts 313 and 323, respectively.

The pouch 40 receives the electrode assembly 50 including the negative and positive electrodes 31 and 32 and is configured (or formed) to draw out the negative and positive electrode lead tabs 61 and 62 to one side. Further, the pouch 40 receives the electrode assembly 50 in the state in which the pouch 40 is superimposed with the electrode assembly 50 and the negative and positive electrodes 31 and 32 configuring the electrode assembly 50 in parallel (e.g., substantially in parallel) with each other. For example, the pouch 40 receives the electrode assembly 50 in such a way that the shape of the pouch 40 is superimposed with shape of the electrode assembly 50 and the negative and positive electrodes 31 and 32, and the shapes are parallel (e.g., substantially parallel) with one another.

For example, the pouch 40 is superimposed with the negative and positive electrodes 31 and 32 in parallel (e.g., substantially in parallel) with each other and has a second bending part C2 formed by molding (or deforming) the sheet used to form the pouch to have a shape corresponding to that of the first bending part C1. Therefore, the rechargeable battery 100 has a shape in which the first and second bending parts C1 and C2 are superimposed with each other, and have shapes corresponding to each other.

For example, the pouch 40 includes a concave member 41 and a plane member 42, which receive the electrode assembly 50. The concave member 41 has a concave part 411, which receives the electrode assembly 50 to surround (e.g., at least partially surround) an outside of the electrode assembly 50. The plane member 42 covers (e.g., at least partially covers) the electrode assembly 50 and is heat-fused to an edge 412 of the concave member 41 to form the sealed pouch 40.

The pouch 40 has (e.g., is formed to have) a multilayered sheet structure and includes, for example, a polymer sheet 121, which forms an inner surface of the pouch 40 for insulating and heat fusion action, and a polyethyleneterephthalate (PET) sheet, a nylon sheet, or a PET-nylon composite sheet 122, which forms an outer surface for protection.

For example, the pouch 40 further includes a metal sheet 123 which is between the polymer sheet 121 and the polyethyleneterephthalate (PET) sheet, nylon sheet, or PET-nylon composite sheet 122 to provide mechanical strength. For example, the metal sheet 123 may include (e.g., be formed of) an aluminum sheet.

The negative and positive electrode lead tabs 61 and 62 are drawn out (e.g., protrude) to the same side of the electrode assembly 50, but the present disclosure is not limited thereto. For example, the negative and positive electrode lead tabs may be drawn out (e.g., protrude) to opposite sides of the electrode assembly.

Because the negative and positive electrode lead tabs 61 and 62 protrude outside of the heat-fused pouch 40, the electrode assembly 50 may be electrically connected to the outside of the pouch 40. In this case, insulating members 161 and 162 may coat the negative and positive electrode lead tabs 61 and 62, respectively, on the pouch 40 to electrically insulate the negative and positive electrode lead tabs 61 and 62 from the pouch 40 and to improve the insulation between the negative and positive electrode lead tabs 61 and 62.

The second bending part C2 is a part that sets a height difference at the concave member 41 and the plane member 42 based on the plane so that the second bending part C2 is superimposed with the first bending part C1, and has a shape corresponding to that of the first bending part C1. As a result of the presence of the second bending part C2, a portion of the concave member 41 and the plane member 42 lies within a plane and an other portion of the concave member 41 and the plane member 42 lies outside of the plane. For example, the second bending part C2 allows the concave member 41 and the plane member 42 to have any suitable shape, such as various three-dimensional shapes deviating from a planar shape. The second bending part may also be formed concavely and/or convexly like a human face shape, and have a shape corresponding to that of the first bending part.

For example, the second bending part C2 of the concave member 41 and the plane member 42 includes a third bend C21 and a fourth bend C22. The third bend C21 occurs (e.g., is bent) at the concave member 41 and the plane member 42 to have a shape corresponding to that of the first bend C11, and the fourth bend C22 occurs (e.g., is bent) at the concave member 41 and the plane member 42 to have a shape corresponding to that of the second bend C12. For convenience, in FIG. 5, reference numerals for the second bending part C2, the third bend C21, and the fourth bend C22 are illustrated only at the concave member 41 and are not illustrated at the plane member 42.

Figure 6:
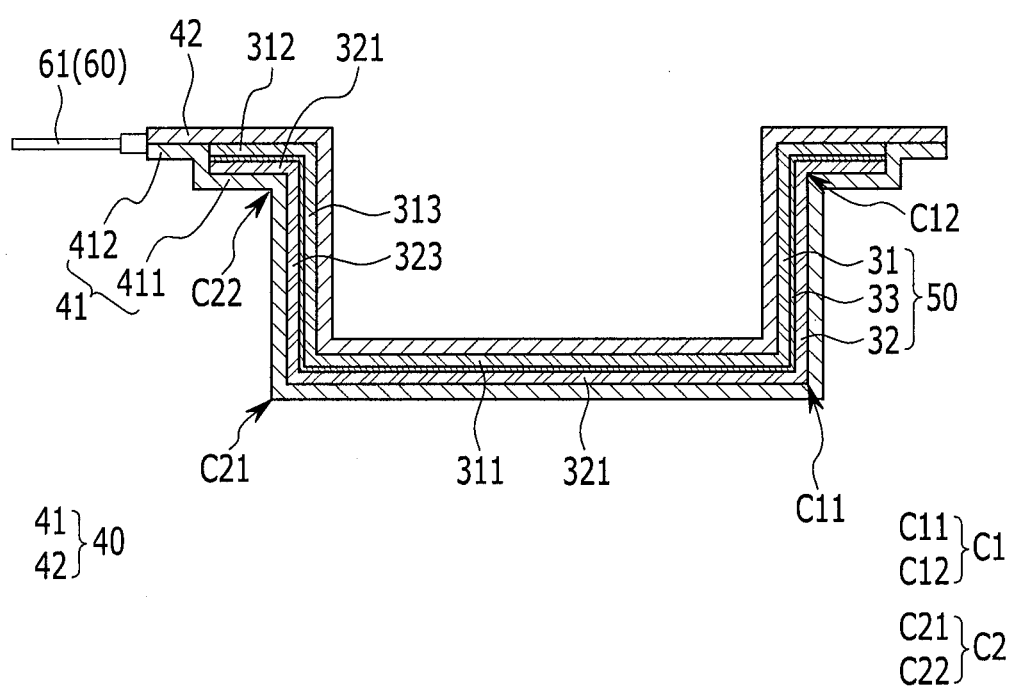
FIG. 6 is a cross-sectional view of the rechargeable battery of FIG. 4 taken along line VI-VI.
Figure 7:
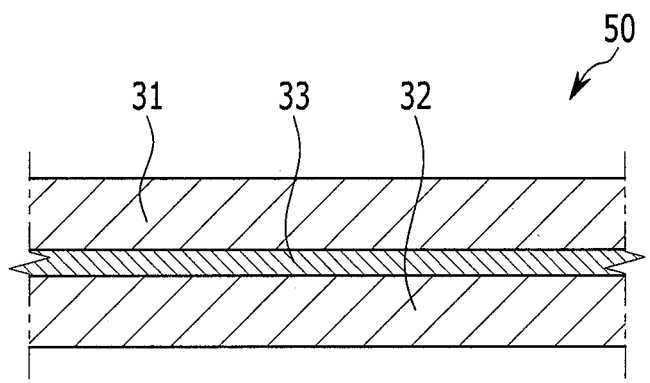
FIG. 7 is a cross-sectional view of a portion of an electrode assembly of the rechargeable battery of FIG. 6.

FIG. 6 is a cross-sectional view of the rechargeable battery of FIG. 4 taken along line VI-VI, and FIG. 7 is a cross-sectional view of a portion of the electrode assembly of FIG. 6. Referring to FIGS. 6 and 7, in the electrode assembly 50, the separator 33 may have adhesion (e.g., the separator may be adhesive or include an adhesive). In this case, according to the method for manufacturing a rechargeable battery, in the assembling of the electrode assembly ST4, the negative and positive electrodes 31 and 32 are respectively stacked and attached on two (e.g., both) surfaces of the separator 33 having adhesion. For example, the negative electrode 31 may be adhered to a surface of the separator 33, and the positive electrode 32 may be adhered to an other surface of the separator 33.

The negative and positive electrodes 31 and 32 and the separator 33 are stacked with each other. In this case, the adhesion of the separator 33 may fix the negative and positive electrodes 31 and 32 to the two (e.g., both) surfaces of the separator 33. Therefore, the stacking process of the negative and positive electrodes 31 and 32 and the separator 33 is readily performed.

The negative and positive electrodes 31 and 32 may be formed with the same (e.g., substantially the same) thickness. Therefore, the negative and positive electrodes 31 and 32 may be manufactured by the same (e.g., substantially the same) process, thereby simplifying the manufacturing process. In this case, in the assembling of the electrode assembly ST4, the negative and positive electrodes 31 and 32 are formed with the same (e.g., substantially the same) thickness and may be stacked and attached on the two (e.g., both) surfaces of the separator 33.

Hereinafter, another embodiment of the present invention will be described. Components of the present embodiment that are the same (e.g., substantially the same) as those described above will not be described further here, and different components will be described instead.

Figure 8:
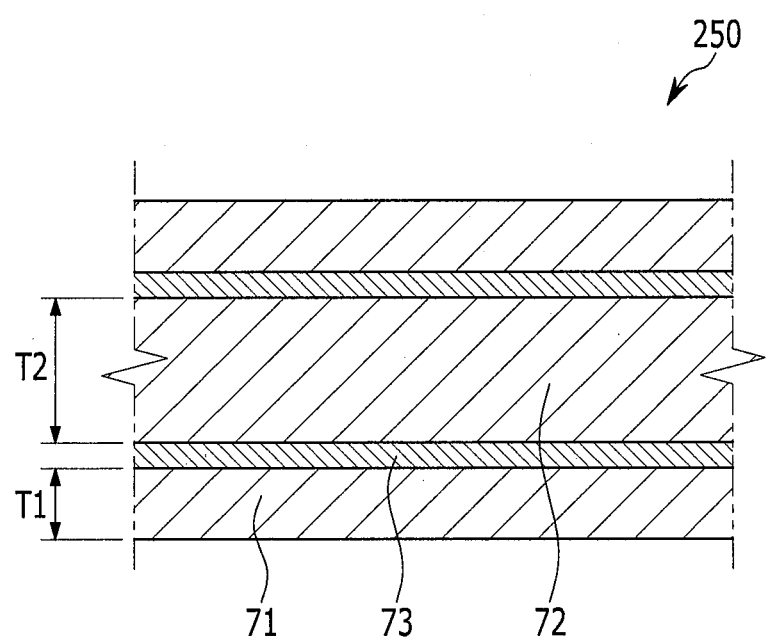
FIG. 8 is a cross-sectional view of a portion of an electrode assembly according to another embodiment.

FIG. 8 is a cross-sectional view of a portion of an electrode assembly of another embodiment of the present invention. Referring to FIG. 8, in an electrode assembly 250, a positive electrode 72 includes (e.g., is formed of) one sheet and a negative electrode 71 includes (e.g., is formed of) two sheets.

For example, the electrode assembly 250 is formed by locating separators 73 on two (e.g., both) surfaces of a sheet of the positive electrode 72, respectively, and locating one of the negative electrodes 71 on each separator 73. In this case, according to the present embodiment of the method for manufacturing a rechargeable battery, in the assembling of the electrode assembly ST4, the separators 73 are stacked on the two (e.g., both) surfaces of the positive electrode 72, respectively, and the negative electrodes 71 are attached to the separators 73, respectively.

For example, a thickness T1 of the negative electrode 71 is formed to be ½ a thickness T2 of the positive electrode 72 (e.g., T1=T2/2). In this case, in the assembling of the electrode assembly ST4, the thickness T1 of the negative electrode 71 is formed to be ½ the thickness T2 of the positive electrode 72 (e.g., T1=T2/2) and the negative electrode 71 is attached to the separator 73.

The negative and positive electrodes 71 and 72 are formed to be a thick film to implement (or provide) high capacity, but that may degrade performance due to the constraints of current and ion conductive characteristics as a thickness of the electrode is increased. In this case, the thin negative electrodes 71 are on the two (e.g., both) surfaces of the thick positive electrode 72, thereby overcoming the constraints of the current and ion conductive characteristics. Further, waste of the active material and the current collector resulting from having a portion of the active material and current collector in the negative electrode 71 that does not function (or does not provide a substantial function) due to an excessive thickness of the negative electrode 71 may be prevented (or mitigated).

The electrode assembly 250 according to the present embodiment of the present invention includes one positive electrode 72 and two negative electrodes 71, but the present disclosure is not limited thereto. For example, the electrode assembly may include n positive electrodes 72 and n+1 stacked negative electrodes 71 and obtain the same (e.g., substantially the same) effect as the present embodiment of the present invention at the outermost. According to embodiments of the present disclosure, n may be any suitable integer.

Figure 9:
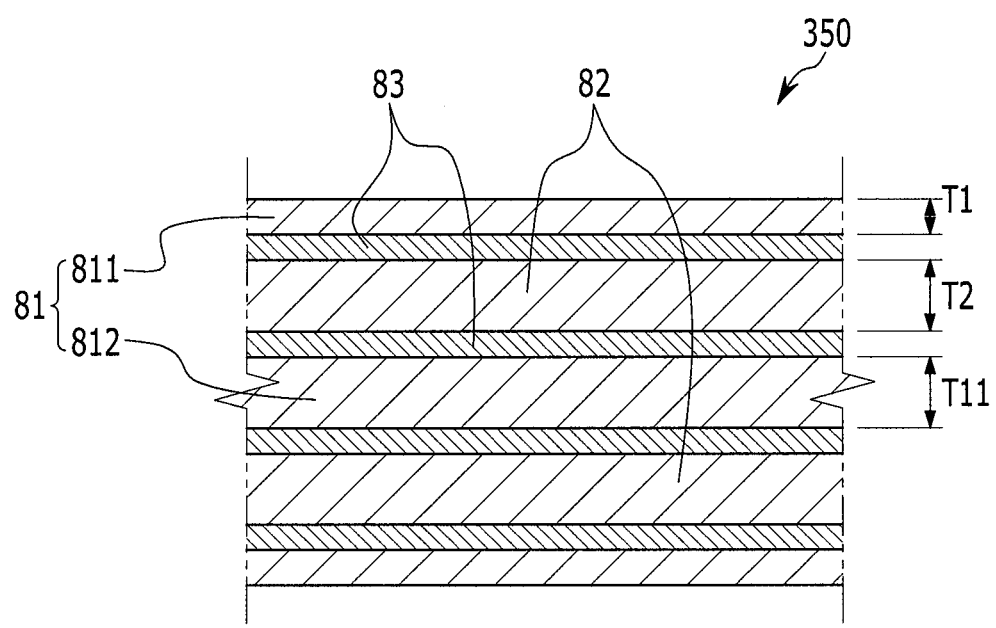
FIG. 9 is a cross-sectional view of a portion of an electrode assembly according to yet another embodiment.

FIG. 9 is a cross-sectional view of a portion of an electrode assembly according to yet another embodiment of the present invention. Referring to FIG. 9, an electrode assembly 350 is formed by alternately stacking the negative electrode 81 and the positive electrode 82, while having a separator 83 therebetween.

For example, n positive electrodes 82 are present and n+1 negative electrodes 81 are present. According to embodiments of the present disclosure, n may be any suitable integer. In this case, the negative electrode 81 includes an outer negative electrode 811 and an inner negative electrode 812. The outer negative electrode 811 is at two (e.g., both) outermost sides of the electrode assembly 350 and has (e.g., is formed with) a thickness T1 that is ½ a thickness T2 of the positive electrode 82 (e.g., T1=T2/2). The inner negative electrode 812 is in the electrode assembly 350 (e.g., at an interior of the electrode assembly 350) and has (e.g., is formed with) a thickness T11 that is the same (e.g., substantially the same) as the thickness T2 of the positive electrode 82 (e.g., T11=T2).

The inner negative electrode 812 and the positive electrode 82, which are stacked in the electrode assembly 350 and face each other, are each (e.g., are formed with) a thick film having the same (e.g., substantially the same) thickness (T11=T2), but the electric current and ions are conducted at a ½ portion (e.g., T11/2, T2/2) at two (e.g., both) sides having the thicknesses T11 and T2 to overcome the constraints of the current and ion conductive characteristics.

Further, the outer negative electrodes 811, which are stacked at the outermost sides of the electrode assembly 350 and face each other, have (e.g., are formed with) the thickness T1 that is ½ the thickness of the positive electrode 82 (e.g., T1=T2/2), such that the outer negative electrode 811 and the positive electrode 82 may overcome the constraints of the current and ion conductive characteristics therebetween. Further, waste of the active material and the current collector resulting from having a portion of the active material and current collector in the outer negative electrode 811 that does not function (or does not provide a substantial function) due to an excessive thickness of the outer negative electrode 811 may be prevented (or mitigated).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery, comprising:
   an electrode assembly comprising a pair of electrodes on respective surfaces of a separator, and a pair of lead tabs extending from the pair of electrodes; and
   a pouch receiving the electrode assembly and having the lead tabs protruding out to one side,
   wherein each of the electrodes comprises a first bending part comprising a molded plate comprising a mixture of active material particles and a metal fiber yarn of a current collector, and the pouch comprises a second bending part superimposed on the electrodes in parallel and comprising a molded sheet having a shape corresponding to that of the first bending part of each of the electrodes,
   wherein the first bending part of each of the electrodes comprises:
   a first plane part having first bends at respective sides of the respective first plane part, each of the first bends forming an angle with respect to the respective first plane part; and
   side parts, each of the side parts being connected to a respective one of the first bends, each of the side parts having a second bend connected to a second plane part extending outwardly from the second bend and being substantially parallel to the respective first plane part.

2. The rechargeable battery of claim 1, wherein the separator is adhesive.

3. The rechargeable battery of claim 2, wherein the pair of electrodes and the separator are stacked together.

4. The rechargeable battery of claim 3, wherein a thickness of each of the pair of electrodes is the same.

5. The rechargeable battery of claim 1, wherein the pouch comprises:
   a concave member having a concave part receiving the electrode assembly to at least partially surround an outside of the electrode assembly; and
   a plane member at least partially covering the electrode assembly and heat-fused to an edge of the concave member.

6. The rechargeable battery of claim 5, wherein the second bending part comprises:
   third bends at the concave member and the plane member, each of the third bends having a shape corresponding to that of a respective one of the first bends of the first bending part of each of the electrodes; and
   fourth bends at the concave member and the plane member, each of the fourth bends having a shape corresponding to that of a respective one of the second bends of the first bending part of each of the electrodes.

7. The rechargeable battery of claim 1, wherein:
   the pair of electrodes comprises a positive electrode and a negative electrode,
   the positive electrode comprises one sheet, and
   the negative electrode comprises two sheets, each of the sheets of the negative electrode being on a respective surface of the sheet of the positive electrode and having the separator therebetween.

8. The rechargeable battery of claim 7, wherein a thickness of each sheet of the negative electrode is equal to ½ of a thickness of the sheet of the positive electrode.

9. The rechargeable battery of claim 8, wherein the electrode assembly comprises alternately stacked n positive electrodes and n+1 negative electrodes, n being an integer.

10. The rechargeable battery of claim 9, wherein the negative electrode comprises:
    an outer negative electrode at an outermost side of the electrode assembly and having a thickness equal to ½ of a thickness of one of the n positive electrodes; and
    an inner negative electrode in the electrode assembly and having a thickness that is the same as that of the one of the n positive electrodes.

11. The rechargeable battery of claim 1, wherein each of the first bends forms a right angle with respect to the respective first plane part, and
    wherein each of the second bends forms a right angle with respect to the respective first plane part.

* * * * *